US012809044B2

(12) United States Patent
Matsubara

(10) Patent No.: US 12,809,044 B2
(45) Date of Patent: Nov. 24, 2026

(54) PHOTOELECTRIC CONVERSION PANEL, X-RAY IMAGE CAPTURING PANEL, AND CONTROL METHOD OF PHOTOELECTRIC CONVERSION PANEL

(71) Applicant: Sharp Display Technology Corporation, Kameyama City (JP)

(72) Inventor: Kunio Matsubara, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 126 days.

(21) Appl. No.: 18/909,310

(22) Filed: Oct. 8, 2024

(65) Prior Publication Data

US 2025/0138203 A1 May 1, 2025

(30) Foreign Application Priority Data

Oct. 30, 2023 (JP) ................................ 2023-185938

(51) Int. Cl.
*G01T 1/20* (2006.01)

(52) U.S. Cl.
CPC ................................ *G01T 1/20184* (2020.05)

(58) Field of Classification Search
CPC ............................ G01T 1/20184; G01T 1/247
See application file for complete search history.

(56) References Cited

U.S. PATENT DOCUMENTS

| | | | | |
|---|---|---|---|---|
| 5,008,544 A * | 4/1991 | Nicolas | H04N 25/20 348/E5.079 |
| 2004/0169752 A1* | 9/2004 | Stark | H04N 25/42 348/307 |
| 2014/0112448 A1* | 4/2014 | Takenaka | H04N 25/30 378/114 |
| 2015/0378034 A1 | 12/2015 | Dowaki et al. | |

FOREIGN PATENT DOCUMENTS

JP 2016-010064 A 1/2016

* cited by examiner

*Primary Examiner* — Carolyn Fin
(74) *Attorney, Agent, or Firm* — ScienBiziP, P.C.

(57) ABSTRACT

A photoelectric conversion panel accumulates charge in a capacitive element during a period in which a photodiode is irradiated by light, by conducting electricity to a first transistor in a state in which a second transistor is interrupted and also in which a third transistor is interrupted, reads the charge accumulated in the capacitive element during a read period, by conducting electricity to the second transistor in a state in which the first transistor is interrupted, and continuously resets the photodiode during a period other than the period in which the photodiode is irradiated by light, by conducting electricity to the third transistor in a state in which the first transistor is interrupted.

4 Claims, 5 Drawing Sheets

12

PHOTOELECTRIC CONVERSION PANEL, X-RAY IMAGE CAPTURING PANEL, AND CONTROL METHOD OF PHOTOELECTRIC CONVERSION PANEL

BACKGROUND

1. Field

The present disclosure relates to a photoelectric conversion panel, an X-ray image capturing panel, and a control method of the photoelectric conversion panel.

2. Description of the Related Art

Japanese Unexamined Patent Application Publication No. 2016-10064 discloses a radiography device that includes photodiodes. Radiography devices perform reset driving, in which photodiodes are reset. Thereafter, charges are generated in the photodiodes in accordance with the quantity of radiation by which irradiation is performed. Sampling driving is then performed during a period in which irradiation is performed by radiation. In the sampling driving, operations are performed in which signals in accordance with charge amount generated at the photodiodes are sampled and held in capacitance. Reset driving is performed after the sampling driving, and following the reset driving, read operations are performed. In the read operations, the sampled signals are subjected to analog-to-digital (AD) conversion, and output as one set of image data.

With radiography devices (X-ray image capturing devices) such as described in the above Japanese Unexamined Patent Application Publication No. 2016-10064, slight amounts of light emitted from scintillators at the time of irradiation by radiation (at the time of irradiation by X-rays) are input to reverse-biased photodiodes, thereby generating current, and the current is formed into an image. The photodiodes are configured such that recombination of remaining carriers generated by photoexcitation in the photodiodes is suppressed, in order to suppress variance (inconsistency) in magnitude of current generated in individual photodiodes.

However, remaining carriers (current) generated in the photodiodes by incident light continue to leak from the photodiodes (leak current is generated) even in a state in which there is no more incident light from outside. Accordingly, repeatedly performing image capturing of X-ray images generates afterimages due to the above leak current in a case of generating X-ray moving images. Further, light continuously enters the photodiodes in a case of generating X-ray moving images, and accordingly there is a problem in that remaining carriers continue to remain, leak current is generated, and afterimages persist. Although reset operations are temporarily performed in the radiography device of the above Japanese Unexamined Patent Application Publication No. 2016-10064, such as before read operations and so forth, this is insufficient to reduce the effects of the leak currents from the photodiodes.

It is desirable to provide a photoelectric conversion panel, an X-ray image capturing panel, and a control method of the photoelectric conversion panel, that can reduce the effects of leak currents from photodiodes.

SUMMARY

According to a first aspect of the present disclosure, there is provided a photoelectric conversion panel including a first transistor, a photodiode that is connected to a first electrode, which is one electrode out of a source electrode and a drain electrode of the first transistor, a capacitive element that is connected to a second electrode, which is another electrode out of the source electrode and the drain electrode of the first transistor, a second transistor that is connected to the first electrode, a third transistor that is connected to the second electrode, and a control circuit that transmits a control signal to a gate electrode of each of the first transistor, the second transistor, and the third transistor. The control circuit performs control to accumulate charge in the capacitive element during a period in which the photodiode is irradiated by light, by conducting electricity to the first transistor in a state in which the second transistor is interrupted and also in which the third transistor is interrupted, read the charge accumulated in the capacitive element during a read period out of a period other than the period in which the photodiode is irradiated by light, by conducting electricity to the second transistor in a state in which the first transistor is interrupted, and continuously reset the photodiode during the period other than the period in which the photodiode is irradiated by light, by conducting electricity to the third transistor in a state in which the first transistor is interrupted.

According to a second aspect, there is provided an X-ray image capturing panel including the photoelectric conversion panel according to the first aspect, and a scintillator that converts X-rays into light, and also performs irradiation of the photodiode by light.

According to a third aspect, there is provided a control method of a photoelectric conversion panel, the method including accumulating charge in a capacitive element during a period in which a photodiode is irradiated by light, by conducting electricity to a first transistor in a state in which a second transistor is interrupted and also in which a third transistor is interrupted, reading the charge accumulated in the capacitive element during a read period out of a period other than the period in which the photodiode is irradiated by light, by conducting electricity to the second transistor in a state in which the first transistor is interrupted, and continuously resetting the photodiode during the period other than the period in which the photodiode is irradiated by light, by conducting electricity to the third transistor in a state in which the first transistor is interrupted. The photoelectric conversion panel includes the first transistor, the photodiode that is connected to a first electrode, which is one electrode out of a source electrode and a drain electrode of the first transistor, the capacitive element that is connected to a second electrode, which is another electrode out of the source electrode and the drain electrode of the first transistor, the second transistor that is connected to the first electrode, and the third transistor that is connected to the second electrode.

DESCRIPTION OF THE EMBODIMENTS

Figure 1:
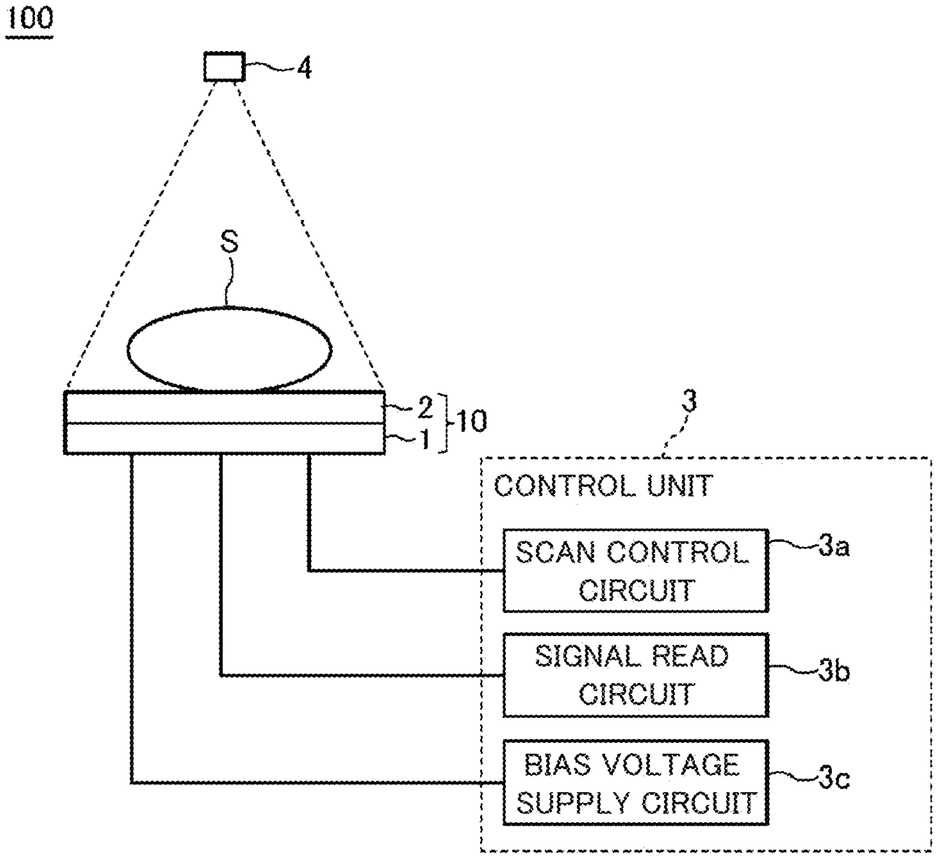
FIG. 1 is a schematic diagram illustrating an X-ray image capturing device that is equipped with an X-ray image capturing panel including a photoelectric conversion panel according to an embodiment.

An embodiment of the present disclosure will be described below with reference to the drawings. Note that the present disclosure is not limited to the following embodiment, and design alterations can be made as appropriate within a range fulfilling the configuration of the present disclosure. Also, in the following description, parts that are the same or parts that have similar functions may be denoted in common by the same symbols throughout different drawings, and repetitive description thereof may be omitted. Also, various configurations described in the embodiment and modifications thereof may be combined or altered as appropriate without departing from the spirit and scope of the present disclosure. In the drawings which will be referenced below, configurations may be simplified or schematized in illustration, and part of configuration members may be omitted, in order to facilitate understanding of the description. Also, the dimensional ratios among the configuration members illustrated in the drawings do not necessarily indicate actual dimensional ratios.

Configuration of X-ray Image Capturing Device 100

FIG. 1 is a schematic diagram illustrating an X-ray image capturing device 100 that is equipped with an X-ray image capturing panel 10 including a photoelectric conversion panel 1 according to the present embodiment. The X-ray image capturing device 100 includes the X-ray image capturing panel 10 that includes the photoelectric conversion panel 1 and a scintillator 2, a control unit 3, and an X-ray source 4. The X-ray image capturing device 100 is configured to repeatedly perform X-ray image capturing, and generate X-ray moving images on the basis of the images that are image captured.

As illustrated in FIG. 1, the control unit 3 includes a scan control circuit 3*a*, a signal read circuit 3*b*, and a bias voltage supply circuit 3*c*. The control unit 3 includes a processor that executes control processing of the X-ray image capturing device 100. The scan control circuit 3*a*, the signal read circuit 3*b*, and the bias voltage supply circuit 3*c* are each connected to the photoelectric conversion panel 1. Although the scan control circuit 3*a*, the signal read circuit 3*b*, and the bias voltage supply circuit 3*c* are illustrated as separate blocks from each other in FIG. 1, these may be configured as an integral circuit.

The X-ray source 4 irradiates a subject S with X-rays. The X-rays that have passed through the subject S are converted into luminescence (hereinafter referred to as "scintillation light") at the scintillator 2 disposed upon the photoelectric conversion panel 1. The X-ray image capturing device 100 generates X-ray images by performing image capturing of the scintillation light at the X-ray image capturing panel 10.

Figure 2:
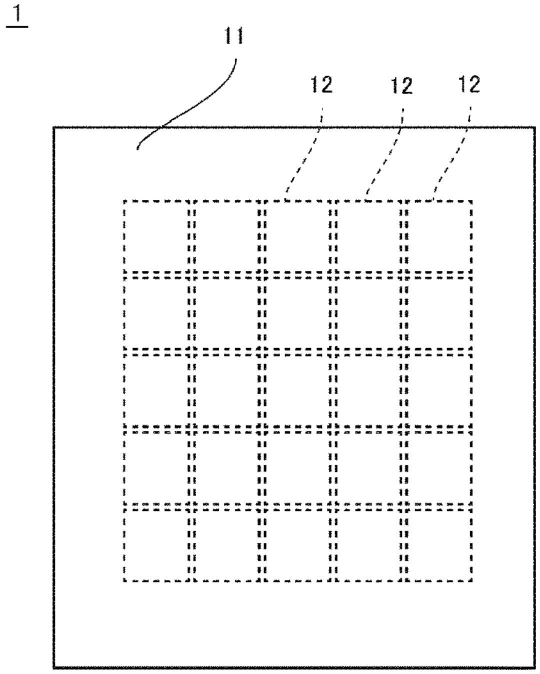
FIG. 2 is a plan schematic view of an overall configuration of the photoelectric conversion panel.

FIG. 2 is a plan schematic view of an overall configuration of the photoelectric conversion panel 1. A plurality of sensors 12 are arrayed in a matrix on a substrate 11 of the photoelectric conversion panel 1.

Figure 3:
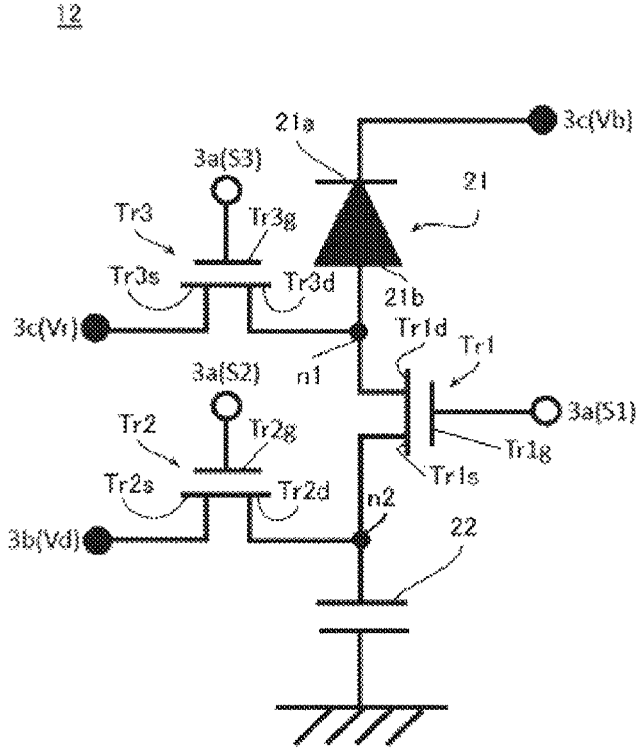
FIG. 3 is a circuit diagram illustrating a configuration of a sensor.

FIG. 3 is a circuit diagram illustrating a configuration of the sensor 12. The sensor 12 includes a photodiode 21, a capacitive element 22, and transistors Tr1 to Tr3. The photodiode 21 is a PIN photodiode, for example. The capacitive element 22 is a capacitor.

Semiconductor active layers of the transistors Tr1 to Tr3 are made up of, for example, amorphous oxide semiconductors containing indium (In), gallium (Ga), and zinc (Zn) at a predetermined proportion. Note that the semiconductor active layers are not limited thereto, and $InGaO_3$ $(ZnO)_5$-based, magnesium zinc oxide ($Mg_xZn_{1-x}O$)-based, cadmium zinc oxide ($Cd_xZn_{1-x}O$)-based, cadmium oxide (CdO)-based, InSnZnO (those containing In, tin (Sn), and Zn)-based, and In-aluminum (Al)—Zn-oxygen (O)-based amorphous oxide semiconductors, or the like, can be used. Note that materials that are "amorphous" and "crystalline (including polycrystalline, microcrystalline, and c-axis orientated) are also applicable as oxide semiconductors.

The transistor Tr1 is disposed between the photodiode 21 and the capacitive element 22. The transistor Tr1 is also disposed between the transistors Tr2 and Tr3. A cathode 21*a* of the photodiode 21 is connected to the bias voltage supply circuit 3*c* of the control unit 3 via wiring. The bias voltage supply circuit 3*c* applies bias voltage to the cathode 21*a* of the photodiode 21. An anode 21*b* of the photodiode 21 is connected to the transistors Tr1 and Tr3 via a node n1. One side of the capacitive element 22 is connected to the transistors Tr1 and Tr2 via a node n2. The other side of the capacitive element 22 is connected to a reference potential (e.g., ground).

A gate electrode Tr1*g* of the transistor Tr1 is connected to the scan control circuit 3*a* of the control unit 3 via wiring. The scan control circuit 3*a* supplies a signal S1 to the gate electrode Tr1*g* of the transistor Tr1. A source electrode Tris of the transistor Tr1 is connected to the node n2. A drain electrode Tr1*d* of the transistor Tr1 is connected to the node n1. The gate electrode Tr1*g* of the transistor Tr1 is connected to the scan control circuit 3*a* of the control unit 3 via wiring. The source electrode Tr1*s* of the transistor Tr1 is connected to the node n2. The drain electrode Tr1*d* of the transistor Tr1 is connected to the node n1.

A gate electrode Tr2*g* of the transistor Tr2 is connected to the scan control circuit 3*a* of the control unit 3 via wiring. The scan control circuit 3*a* supplies a signal S2 to the gate electrode Tr2*g* of the transistor Tr2. A source electrode Tr2*s* of the transistor Tr2 is connected to the signal read circuit 3*b* of the control unit 3 via wiring. The signal read circuit 3*b* outputs a voltage Vd for reading a magnitude of a charge accumulated in the capacitive element 22 via the transistor Tr2. A drain electrode Tr2*d* of the transistor Tr2 is connected to the node n2. The voltage Vd is voltage of a value closer to reference voltage than a voltage Vr.

A gate electrode Tr3*g* of the transistor Tr3 is connected to the scan control circuit 3*a* of the control unit 3 via wiring. The scan control circuit 3*a* supplies a signal S3 to the gate electrode Tr3*g* of the transistor Tr3. A source electrode Tr3*s* of the transistor Tr3 is connected to the bias voltage supply circuit 3*c* of the control unit 3 via wiring. The bias voltage supply circuit 3*c* applies the voltage Vr of a magnitude of voltage that is applied in the forward direction to the photodiode 21, to the transistor Tr3. A drain electrode Tr3*d* of the transistor Tr3 is connected to the node n1.

Control Method of Photoelectric Conversion Panel 1

Figure 4:
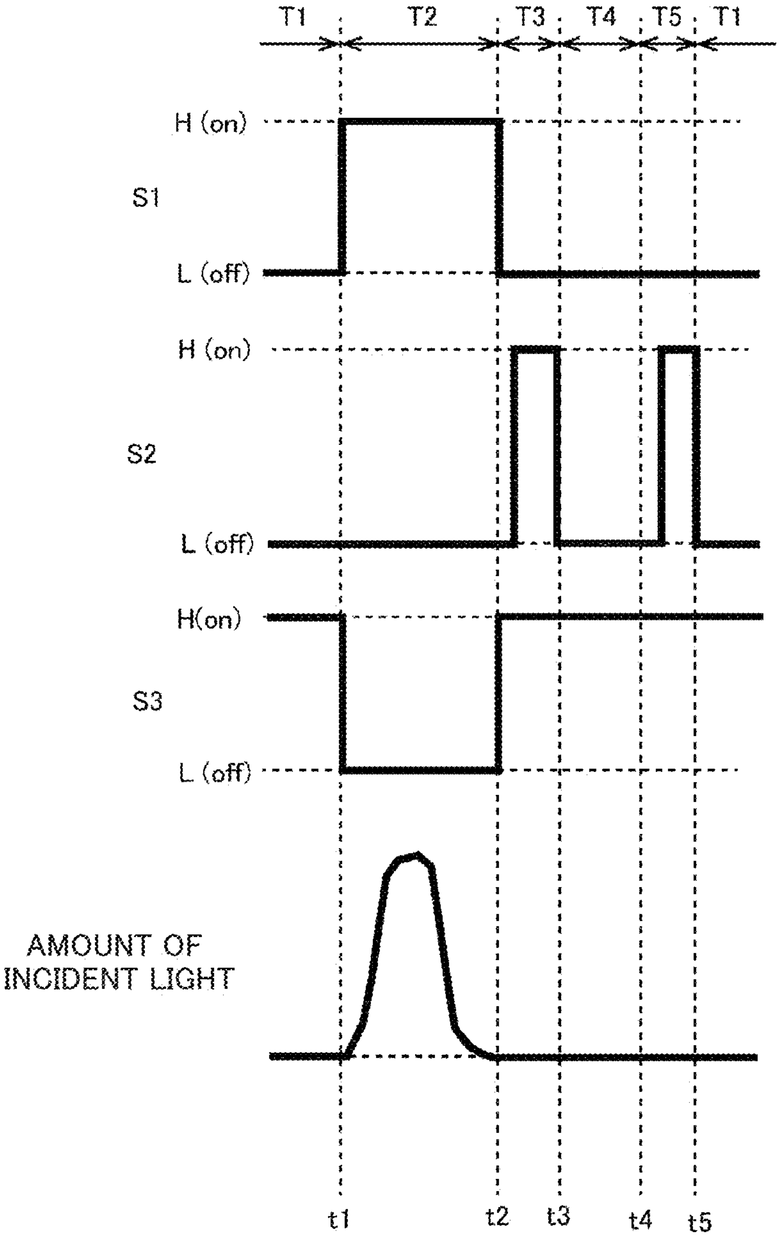
FIG. 4 is a timing chart showing operations of the photoelectric conversion panel.
Figure 5:
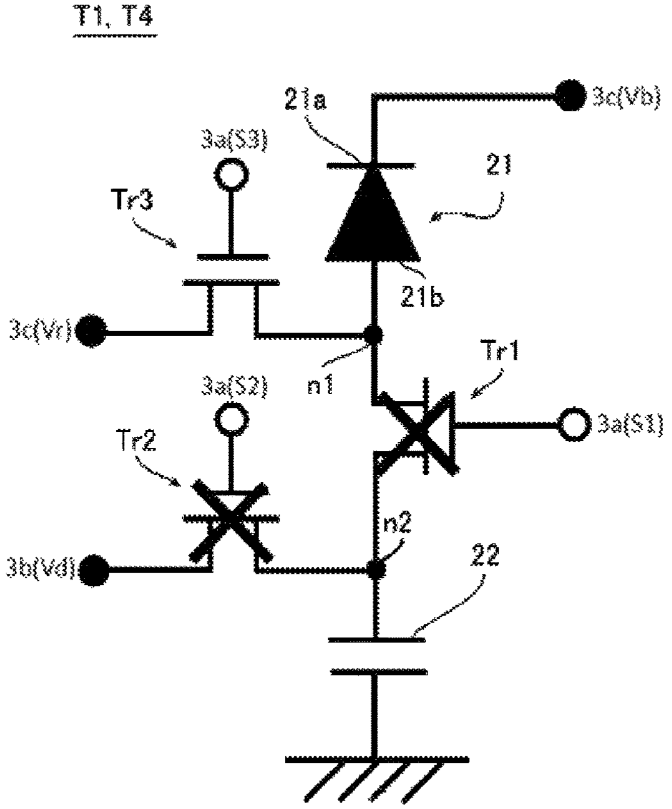
FIG. 5 is a circuit diagram (1) for describing operations of the photoelectric conversion panel.
Figure 6:
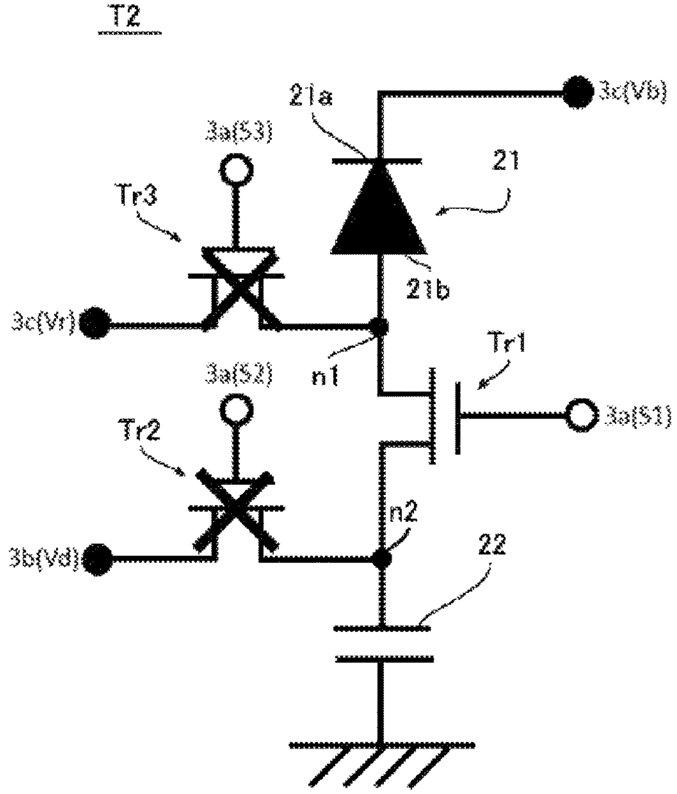
FIG. 6 is a circuit diagram (2) for describing operations of the photoelectric conversion panel.
Figure 7:
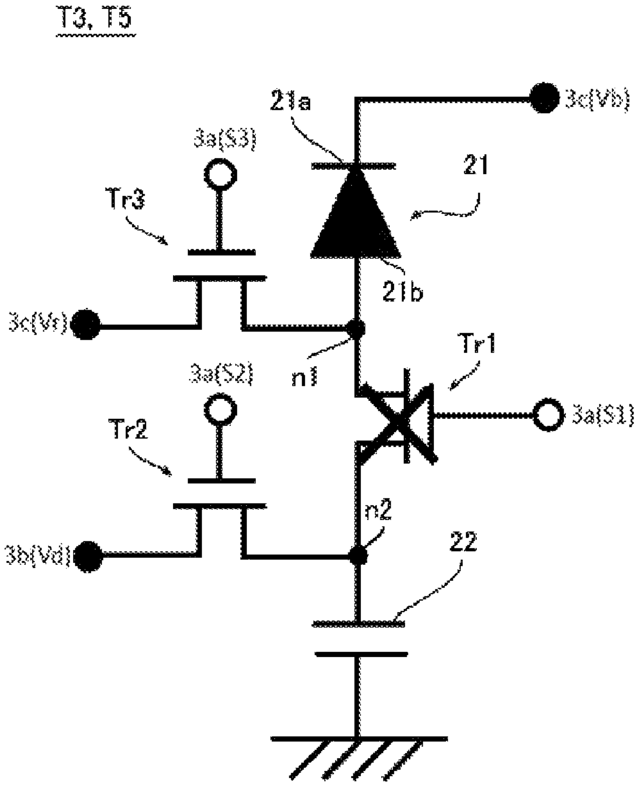
FIG. 7 is a circuit diagram (3) for describing operations of the photoelectric conversion panel.

Next, a control method of the photoelectric conversion panel 1 will be described with reference to FIGS. 4 to 7. FIG. 4 is a timing chart indicating operations of the photoelectric conversion panel 1. FIGS. 5 to 7 are circuit diagrams for describing operations of the photoelectric conversion panel 1. Note that control processing of the photoelectric conversion panel 1 is executed by the control unit 3.

Period T1 Prior to Irradiation by Light

As shown in FIG. 4, in a period T1 prior to a time t1 at which the photodiode 21 of the photoelectric conversion panel 1 is irradiated by light, the photodiode 21 is continuously reset. In the present embodiment, the term "reset" of the photodiode 21 means to apply voltage to the photodiode 21 in the forward direction thereof, so as to remove remaining carriers. The voltage of the signal S1 is Low level, the voltage of the signal S2 is Low level, and the voltage of the signal S3 is High level. Thus, the transistor Tr1 illustrated in FIG. 3 is off (a state in which the source electrode Tr1*s* and the drain electrode Tr1*d* are interrupted), the transistor Tr2 is off, and the transistor Tr3 is on (a state in which the source electrode Tr3*s* and the drain electrode Tr3*d* are conducting). Thus, voltage in the forward direction is applied to the photodiode 21.

Period T2 During Irradiation by Light

As shown in FIG. 4, in a period T2 during which the photodiode 21 is irradiated by light (period from time t1 to time t2), charge is accumulated in the capacitive element 22. As illustrated in FIG. 6, in the period T2, the transistors Tr2 and Tr3 are in the off state, and also the transistor Tr1 is in the on state. Thus, charge is accumulated in the capacitive element 22 by current flowing from the photodiode 21 that is being irradiated by light.

Read Period T3

As shown in FIG. 4, in a read period T3 following the period T2 (period from time t2 to time t3), the charge accumulated in the capacitive element 22 is read out. In the period T3, the transistor Tr1 is in an off state, and the transistor Tr2 and the transistor Tr3 are in an on state, as illustrated in FIG. 7. Accordingly, the charge accumulated in the capacitive element 22 is discharged from the capacitive element 22. The signal read circuit 3*b* then reads the signal (voltage) in accordance with the charge discharged from the capacitive element 22, and the control unit 3 generates an image in accordance with the signal. Also, the photodiode 21 and the capacitive element 22 are in an electrically isolated state. As a result, effects of leak current from the photodiode 21 can be kept from occurring when reading the charge from the capacitive element 22. Also, in the read period T3, the transistor Tr3 is in an on state, and thus the photodiode 21 is reset. Note that the point at which the transistor Tr2 goes to an on state may be later than the time t2, as shown in FIG. 4.

Read Completed Period T4

As shown in FIG. 4, in a read completed period T4 following the read period T3, (period from time t3 to time t4), the transistor Tr2 is switched from on to off. Thus, reading of the charge from the capacitive element 22 is stopped. Also, as illustrated in FIG. 5, the photodiode 21 is reset due to the transistor Tr3 being in an on state in the read completed period T4. Also, the photodiode 21 and the capacitive element 22 are isolated due to the transistor Tr1 being in an off state.

Reset Period T5 for Capacitive Element 22

As shown in FIG. 4, in a reset period T5 for the capacitive element 22 following the read completed period T4, (period from time t4 to time t5), the capacitive element 22 is reset. This "reset" of the capacitive element 22 means to make potential difference between both ends of the capacitive element 22 to be small, thereby discharging charge from the capacitive element 22. In the period T5, the transistor Tr1 is in an off state, and the transistors Tr2 and Tr3 are in an on state, as illustrated in FIG. 7. Thus, remaining charge is discharged from the capacitive element 22. Also, the photodiode 21 is reset. As described above, the photodiode 21 is continuously reset in periods other than the period of irradiation of the photodiode 21 by light, and accordingly leak current in the photodiode 21 that is generated in periods other than the period of irradiation by light is done away with. Thus, the effects of leak current from the photodiode 21 can be reduced. Note that the transistor Tr2 may go to the on state at a time later than the time t4 as shown in FIG. 4.

By controlling operations of the photoelectric conversion panel 1 as described above, the effects of leak current from the photodiode 21 can be reduced. As a result, even in a case of the X-ray image capturing device 100 repeatedly performs X-ray image capturing and generates an X-ray moving image on the basis of the images that are image captured, delay (lagging) and afterimages (ghosting) can be suppressed from occurring.

Modifications

Although an embodiment is described above, the above-described embodiment is only an exemplification for carrying out the present disclosure. Accordingly, the present disclosure is not limited to the above-described embodiment, and the above-described embodiment can be carried out modified variously as appropriate, without departing from the spirit and scope thereof.

(1) Although an example of resetting the capacitive element 22 in the period T5 is given in the above-described embodiment, the present disclosure is not limited to this. For example, the capacitive element 22 may be reset in a period other than the period T5, as long as other than the period T2.

(2) Although an amorphous oxide semiconductor containing In, Ga, and Zn in accordance with a predetermined proportion is described as being the material for the semiconductor of the transistors Tr1 to Tr3 in the above-described embodiment, the present disclosure is not limited to this. For example, amorphous silicon (a-Si) may be used as the material for the semiconductor of the transistors Tr1 to Tr3.

The photoelectric conversion panel, the X-ray image capturing panel, and the control method of the photoelectric conversion panel 1, which are described above, may also be described as follows.

A photoelectric conversion panel according to a first configuration includes a first transistor, a photodiode that is connected to a first electrode, which is one electrode out of a source electrode and a drain electrode of the first transistor, a capacitive element that is connected to a second electrode, which is another electrode out of the source electrode and the drain electrode of the first transistor, a second transistor that is connected to the first electrode, a third transistor that is connected to the second electrode, and a control circuit that transmits a control signal to a gate electrode of each of the first transistor, the second transistor, and the third transistor. The control circuit performs control to accumulate charge in the capacitive element during a period in which the photodiode is irradiated by light, by conducting electricity to the first transistor in a state in which the second transistor is interrupted and also in which the third transistor is interrupted, read the charge accumulated in the capacitive element during a read period out of a period other than the period in which the photodiode is irradiated by light, by conducting electricity to the second transistor in a state in which the first transistor is interrupted, and continuously reset the photodiode during the period other than the period in which the photodiode is irradiated by light, by conducting electricity to the third transistor in a state in which the first transistor is interrupted (first configuration).

According to the above first configuration, charge is accumulated in the capacitive element during the period in which the photodiode is irradiated by light. The charge is then read from the capacitive element during the read period following the period in which the photodiode is irradiated by light in a state in which the capacitive element and the photodiode are isolated by the first transistor. Accordingly, effects of leak current from the photodiode can be suppressed when reading the charge from the capacitive element in the read period. The photodiode is continuously reset during the period other than the period in which the photodiode is irradiated by light, and accordingly the leak current in the photodiode that is generated in the period other than the period of irradiation by light is done away with. Thus, the effects of leak current from the photodiode can be reduced.

In the first configuration, the control circuit may be configured to perform control to reset the capacitive element following the read period, by conducting electricity to the second transistor in the state in which the first transistor is interrupted (second configuration).

According to the above second configuration, the capacitive element can be reset, and accordingly unnecessary charge that would cause noise can be suppressed from remaining in the capacitive element.

An X-ray image capturing panel according to a third configuration includes the photoelectric conversion panel according to the first or second configuration, and a scintillator that converts X-rays into light, and also performs irradiation of the photodiode by light.

According to the above third configuration, the photoelectric conversion panel according to the first or the second configuration is included, and accordingly an X-ray image capturing panel that is capable of reducing effects of leak current from the photodiode can be provided.

A control method of a photoelectric conversion panel according to a fourth configuration includes accumulating charge in a capacitive element during a period in which a photodiode is irradiated by light, by conducting electricity to a first transistor in a state in which a second transistor is interrupted and also in which a third transistor is interrupted, reading the charge accumulated in the capacitive element during a read period out of a period other than the period in which the photodiode is irradiated by light, by conducting electricity to the second transistor in a state in which the first transistor is interrupted, and continuously resetting the photodiode during the period other than the period in which the photodiode is irradiated by light, by conducting electricity to the third transistor in a state in which the first transistor is interrupted. The photoelectric conversion panel includes the first transistor, the photodiode that is connected to a first electrode, which is one electrode out of a source electrode and a drain electrode of the first transistor, the capacitive element that is connected to a second electrode, which is another electrode out of the source electrode and the drain electrode of the first transistor, the second transistor that is connected to the first electrode, and the third transistor that is connected to the second electrode (fourth configuration).

The present disclosure contains subject matter related to that disclosed in Japanese Priority Patent Application JP 2023-185938 filed in the Japan Patent Office on Oct. 30, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A photoelectric conversion panel, comprising:

a first transistor;

a photodiode that is connected to a first electrode, which is one electrode out of a source electrode and a drain electrode of the first transistor;

a capacitive element that is connected to a second electrode, which is another electrode out of the source electrode and the drain electrode of the first transistor;

a second transistor that is connected to the first electrode;

a third transistor that is connected to the second electrode; and a control circuit that transmits a control signal to a gate electrode of each of the first transistor, the second transistor, and the third transistor, wherein the control circuit performs control to accumulate charge in the capacitive element during a period in which the photodiode is irradiated by light, by conducting electricity to the first transistor in a state in which the second transistor is interrupted and also in which the third transistor is interrupted, read the charge accumulated in the capacitive element during a read period out of a period other than the period in which the photodiode is irradiated by light, by conducting electricity to the second transistor in a state in which the first transistor is interrupted, and continuously reset the photodiode during the period other than the period in which the photodiode is irradiated by light, by conducting electricity to the third transistor in a state in which the first transistor is interrupted.

2. The photoelectric conversion panel according to claim 1, wherein the control circuit performs control to reset the capacitive element following the read period, by conducting electricity to the second transistor in the state in which the first transistor is interrupted.

3. An X-ray image capturing panel, comprising:

the photoelectric conversion panel according to claim 1; and a scintillator that converts X-rays into light, and also performs irradiation of the photodiode by light.

4. A control method of a photoelectric conversion panel, the method comprising:

accumulating charge in a capacitive element during a period in which a photodiode is irradiated by light, by conducting electricity to a first transistor in a state in which a second transistor is interrupted and also in which a third transistor is interrupted;

reading the charge accumulated in the capacitive element during a read period out of a period other than the period in which the photodiode is irradiated by light, by conducting electricity to the second transistor in a state in which the first transistor is interrupted; and continuously resetting the photodiode during the period other than the period in which the photodiode is irradiated by light, by conducting electricity to the third transistor in a state in which the first transistor is interrupted, wherein the photoelectric conversion panel includes the first transistor, the photodiode that is connected to a first electrode, which is one electrode out of a source electrode and a drain electrode of the first transistor, the capacitive element that is connected to a second electrode, which is another electrode out of the source electrode and the drain electrode of the first transistor, the second transistor that is connected to the first electrode, and
the third transistor that is connected to the second electrode.

* * * * *